July 16, 1957
P. FARNY ET AL
2,799,259
INTERNAL COMBUSTION ENGINE
Filed June 1, 1954
3 Sheets-Sheet 1
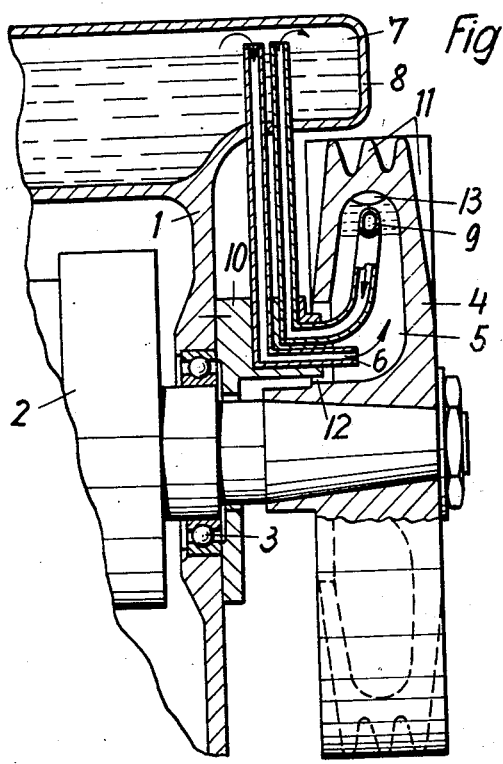
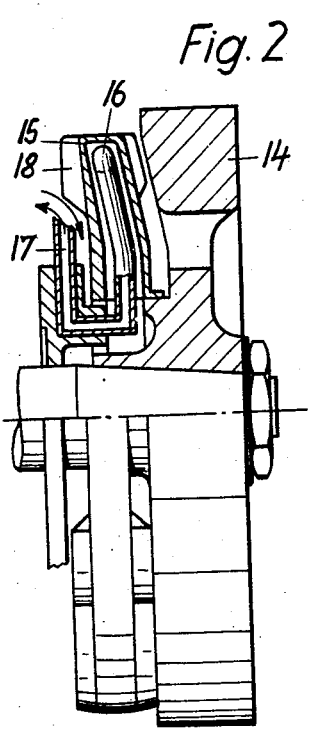
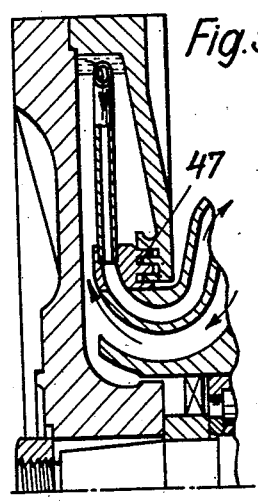
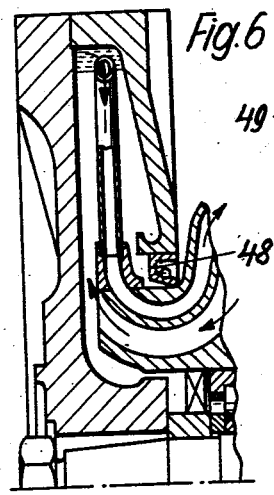
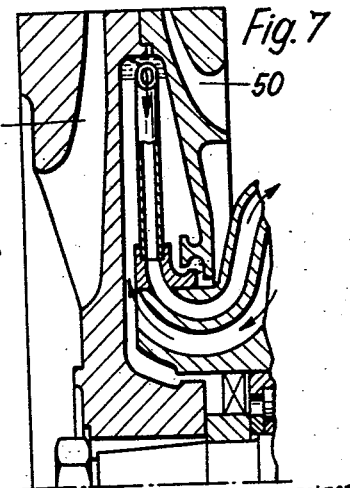
INVENTORS:
PAUL FARNY AND
ERNST WEIDMANN
BY:

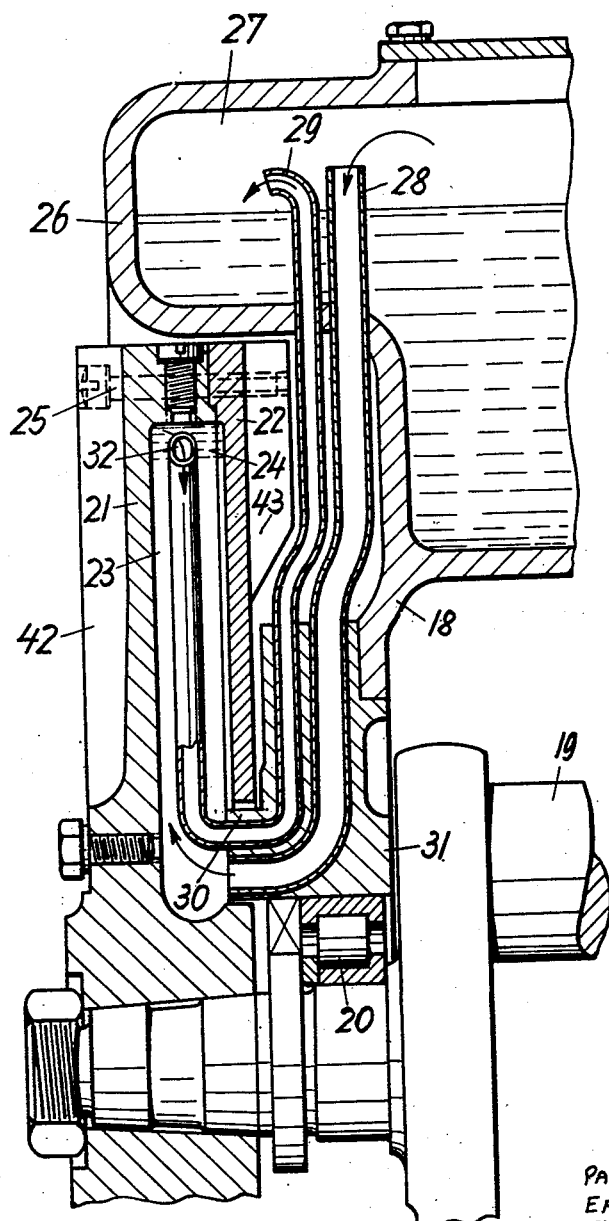

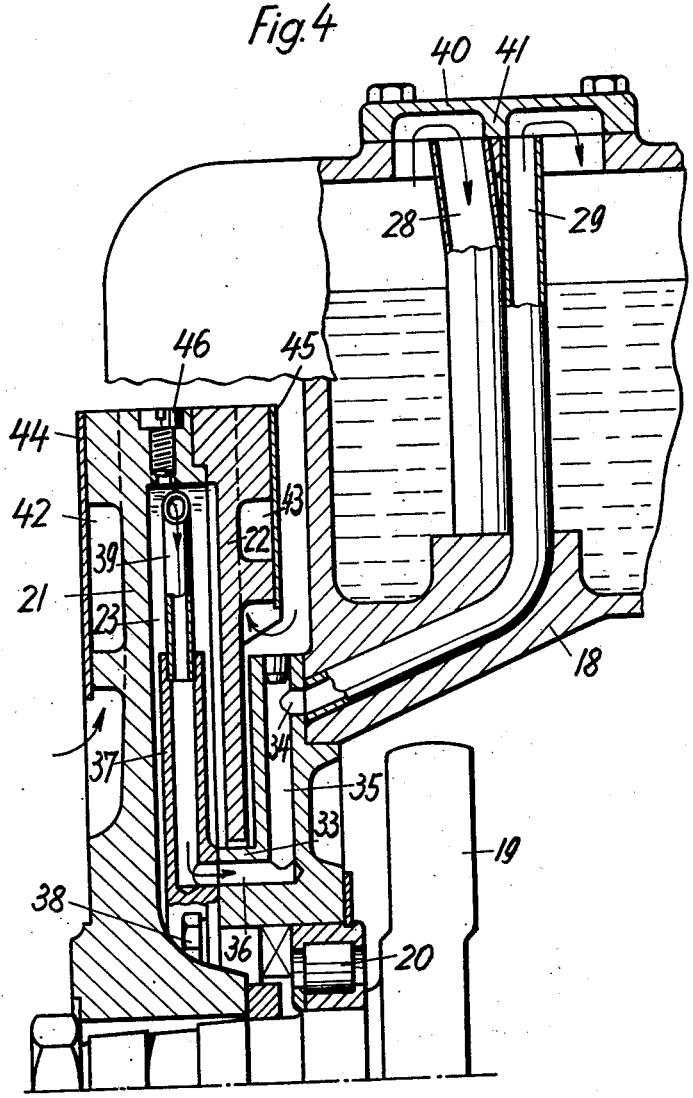

United States Patent Office 2,799,259
Patented July 16, 1957

2,799,259

INTERNAL COMBUSTION ENGINE

Paul Farny, Mannheim-Ilvesheim, and Ernst Weidmann, Weinheim, Germany

Application June 1, 1954, Serial No. 433,784

Claims priority, application Germany May 30, 1953

8 Claims. (Cl. 123—41.43)

This invention concerns an internal combustion engine with evaporation cooling.

According to the present invention the steam from the steam-chamber of the cooling water jacket of the internal combustion engine is introduced for condensation axially or substantially radially outwardly from the inner region of a somewhat disc-shaped or annular disc-shaped hollow space in a housing acting as a condenser and set in rotation by the internal combustion engine, so that through the rotation it is flung to the outer periphery of the hollow space, where it condenses, and at least one stationary scoop is situated on the end of a tube likewise projecting from the inner portion of said hollow space outwards as far as the region of the outer periphery thereof, said scoop receiving and conducting the condensate back to the cooling water jacket of said internal combustion engine.

The condenser may consist of a housing arranged on the flywheel of the internal combustion engine or the flywheel of the internal combustion engine can itself be constructed as a condenser and enclose the disc-shaped, or as the case may be, annular disc-shaped hollow space.

In order to promote the condensation of the steam, the housing or the flywheel respectively, enclosing the hollow space is advantageously provided with cooling ribs. Through such a ribbing the air regulation for the cooling of the housing is improved and a greater condensation of steam is obtained. The condensed steam builds a water ring in the interior of the condenser at the periphery of the same, out of which the scoop takes the water and leads it back to the internal combustion engine.

In a further development of the invention, the flywheel is divided in a plane passing through the disc-shaped hollow space and at right angles to the axis of rotation of the engine. The two flywheel halves may conveniently be held together by means of screws. The tubes conducting both the steam and the condensate can moreover be connected to the annular disc-shaped hollow space of the condenser through a cover for the flywheel bearing, which cover for this purpose preferably consists of an annular flange projecting into an annular clearance in the flywheel, and the tubes preferably extend in the flange of the bearing cover in a horizontal direction lying side by side. The bearing cover may, however, alternatively be provided with an annular flange projecting into the annular clearance of the flywheel, and bores serving for the conduction of the water can be provided in the bearing cover as well as in the flange.

The invention will be described further, by way of example, with reference to the accompanying drawings, in which:

Fig. 1 is a section through a flywheel constructed as a condenser and a part of the associated motor.

Fig. 2 is a section through a flywheel and also a housing secured to it and acting as a condenser.

Figs. 3 and 4 each show a section through the upper half of a flywheel and a part of the water cistern of the internal combustion engine in two further embodiments of the invention, and Figs. 5 to 7 are sections through the flywheel with special forms of construction of the packing of the annular clearance and the cooling air ribs.

In the embodiment of the invention shown in Fig. 1, a crankshaft 2 is journalled in the housing 1 of the internal combustion engine, one bearing 3 being visible in Fig. 1. A flywheel 4 is arranged on the end of the crankshaft, and at the same time is constructed as a condenser. For this purpose it possesses a hollow chamber 5 in which terminates a steam conduit 6 adapted to lead the steam out of the upper space 7 of a cooling water jacket 8 to the chamber 5. A scoop 9 is provided to lead the condensed water back out of the chamber 5 and into the cooling water jacket 8. In this embodiment of the invention, the tubes serving as conduits are held in a flange 10 of a cover closing the bearing 3, but they may alternatively be cast solidly in the housing of the internal combustion engine and be connected with the condenser chamber 5 by means of bores in the bearing cover. The scoop 9 in the latter event is connected with the bearing cover through a screwed coupling, whilst a steam conduit from the flange of said bearing cover to the condenser chamber is not required.

At the periphery of the flywheel 4 are arranged ribs 11 for improving the ventilation of the flywheel. The feeding in of the steam or the condensate respectively takes place at the side of the condenser facing the internal combustion engine. The annular clearance 12 required for leading the conduits into the condenser chamber 5 is not provided in this embodiment of the invention with any packing, and hence the said opening 12 at the same time acts as a safety device avoiding an inadmissible rise in pressure in the condenser housing and in the cooling water chamber of the internal combustion engine.

At the periphery of the inner chamber 5 of the condenser, fins 13 are arranged in order to take the water denser with them and thus generate a greater back pressure at the scoop 9. Similar fins can also be disposed at both the side walls of the chamber 5 of the condenser.

In the embodiment shown in Fig. 2, the condenser consists of a housing 15 secured to the flywheel 14, and the steam supply pipe to the condenser together with the outlet pipe from the condenser lie behind one another, only the outlet pipe 17 being visible. A scoop 16 conveys the condensed water through the associated conduit 17 to the cooling water chamber of the internal combustion engine. Also in this embodiment of the invention, ribs 18 are disposed on the housing 15, in order to increase the rotation of the air and to improve the cooling action of the condenser.

In the embodiments according to Figs. 3 and 4, a crankshaft 19 is journalled in the housing 18 of the internal combustion engine. The upper half of one of the crangshaft bearings 20 is shown in Fig. 3 and also in Fig. 4. The flywheel is arranged at the end of the crankshaft 19, and at the same time is constructed as a condenser, and in both the illustrated embodiments, consists in accordance with the invention of two parts 21 and 22. At their inner sides the two parts 21 and 22 possess outlets so that in a fitted-together condition they result in a disc-shaped hollow chamber 23, into which the steam formed from the heating-up of the cooling water of the internal combustion engine is conducted, in order to become condensed therein. The condensate is indicated in the drawing by 24. The division of the flywheel runs in a plane perpendicular to the axis of rotation of the crankshaft. The two halves of the flywheel are held together through a peripheral, transversely arranged set screw 25. 26 is the cooling water jacket of the internal combustion engine in which the evolution of steam occurs. The steam chamber of the water cistern is indicated by 27, and in it terminate at somewhat the same height, the steam pipe 28 and the water conducting pipe 29. Both pipes penetrate into the cooling water jacket of the internal combustion engine and are held at their lower regions in an annular flange 30 of a bearing cover 31, in which they extend lying adjacent to one another. The steam pipe 28 terminates at the left face of the flange 30, whilst the water pipe 29 is led up to the condensate ring 24 and there terminates in a scoop 32. This scoop 32 dips into the water ring 24 and the pressure resulting from the rotation of the flywheel urges the water continually out of the condenser chamber into the cooling water chamber 26 of the internal combustion engine. The annular flange 30 engages without packing, into a clearance in the flywheel, and the limits of the annular clearance for the flange freely engaging therein are defined by the two flywheel halves. The tube 28 for the steam is given a greater cross-section than the tube 29 for the condensed water. A closable bore is arranged on the annular flange of the bearing cover at the side lying opposite the flywheel at the level of the conduit opening. At its upper end the water tube 29 is laterally deflected, in order to facilitate the shaking of the water out of the tube.

In the embodiment shown in Fig. 4, the crankshaft 19 is once again journalled in the housing 18 of the internal combustion engine. The flywheel likewise consists of two parts 21 and 22, which are held together through screws, and the annular disc-shaped hollow space is again indicated by 23. The bearing cover of the flywheel bearing 20 is once again provided with an annular flange 33, which projects freely and without packing into an annular clearance in the flywheel. In this embodiment, the bearing cover as well as the annular flange exhibit bores 34, 35, 36 which serve for conducting the condensate. The bores for the conduction of the steam are not visible in Fig. 4.

At the outlet of the bores serving to conduct the water, a holder 37 provided with a bore is secured by means of screws 38. The scoop tube 39 is screwed into this holder.

The steam tube 28 as well also as the water conducting tube 29 discharge through a steam dome disposed on the water cistern of the internal combustion engine and closable by a cover 40. A direct transfer from the one tube outlet to the other is prevented by a rib 41 on the steam dome cover 40.

In both the embodiments of Figs. 3 and 4, the two flywheel halves 21 and 22 are provided at their outer sides with radial air ribs 42, 43 extending transversely to the direction of rotation. Through these ribs is obtained a strong ventilation and a good heat loss from the condensate housing to the air, so that a rapid condensation of the steam is obtained. The ventilating ribs can preferably, as shown in Fig. 4, be covered by circular guard plates 44, 45 at the regions lying furthest away from the axis of rotation.

One or more bores closable by means of screws 46 serve for the extraction of water from the flywheel of a shut-down machine, such bores being located at the periphery of the flywheel.

In the embodiment according to Fig. 5, the annular clearance at the flywheel is sealed against small pressures by means of a labyrinth 47. A sealing ring 48 may also serve for the sealing of the annular clearance, and may conveniently be constructed as shown in Fig. 6. Fig. 7 shows in particular a new form of construction for the leading back of the cooling air to the flywheel, in which the cooling air is mainly guided in the outer part through channels 49, 50.

We claim:

1. In an internal combustion engine including a shaft and a cooling water jacket enclosing a steam chamber, in combination, a housing serving as a condenser and being connected to said shaft to be rotated by the engine, said housing being formed with a substantially annular space which is totally enclosed except for an annular clearance on one side of said housing and surrounds said shaft; a steam inlet conduit means communicating with the steam chamber and having a port opening into said annular space, said steam inlet conduit means passing through said annular clearance whereby steam is introduced into said space to be urged by centrifugal force in outward direction for condensation to form a condensate; and an outlet conduit means passing through said clearance and connecting said steam chamber with said annular space, said outlet conduit means including at least one stationary tube projecting outwardly from the inner portion of said space to the outer portion of said space, and a scoop at the outer end of said tube and adapted to receive condensate so that the condensate flows through said outlet conduit means to said steam chamber.

2. In an internal combustion engine including a shaft and a cooling water jacket enclosing a steam chamber, in combination, a flywheel fixed on said shaft; a housing serving as a condenser and being fixed on said flywheel to be rotated by the engine, said housing being formed with a substantially annular space which is totally enclosed except for an annular clearance on one side of said housing and surrounds said shaft; a steam inlet conduit means communicating with the steam chamber and having a port opening into said annular space, said steam inlet conduit means passing through said annular clearance whereby steam is introduced into said space to be urged by centrifugal force in outward direction for condensation to form a condensate; and an outlet conduit means passing through said clearance and connecting said steam chamber with said annular space, said outlet conduit means including at least one stationary tube projecting outwardly from the inner portion of said space to the outer portion of said space, and a scoop at the outer end of said tube and adapted to receive condensate so that the condensate flows through said outlet conduit means to said steam chamber.

3. In an internal combustion engine including a shaft and a cooling water jacket enclosing a steam chamber, in combination, a flywheel serving as a condenser and being connected to said shaft to be rotated by the engine, said flywheel being formed with a substantially annular space which is totally enclosed except for an annular clearance on one side of said flywheel and surrounds said shaft; a steam inlet conduit means communicating with the steam chamber and having a port opening into said annular space, said steam inlet conduit means passing through said annular clearance whereby steam is introduced into said space to be urged by centrifugal force in outward direction for condensation to form a condensate; and an outlet conduit means passing through said clearance and connecting said steam chamber with said annular space, said outlet conduit means including at least one stationary tube projecting outwardly from the inner portion of said space to the outer portion of said space, and a scoop at the outer end of said tube and adapted to receive condensate so that the condensate flows through said outlet conduit means to said steam chamber.

4. An internal combustion engine including a shaft and a cooling water jacket enclosing a steam chamber; a flywheel formed with a substantially annular space which is totally enclosed except for an annular clearance on one side of said flywheel and surrounding said shaft, said flywheel being composed of two portions; a bearing for said flywheel; an annular flange mounted on said bearing and projecting through said annular clearance into said space, said flange being formed with inlet and outlet passages having ports opening into said annular space; inlet and outlet conduit means connecting said inlet and outlet passages with said steam chamber; a stationary tube projecting outwardly from said port of said inlet passage to the outer portion of said space; and a scoop at the outer end of said tube adapted to receive condensate so that the condensate flows through said outlet conduit means to said steam chamber.

5. An arrangement as set forth in claim 4 wherein said passages are bores.

6. An arrangement as set forth in claim 4 and including inner fins located in the outer portion of said annular chamber for urging the condensate to rotate with the housing.

7. An arrangement as set forth in claim 4 and including cooling ribs secured to the outside of said housing.

8. An arrangement as set forth in claim 4 and including radial cooling ribs secured to the outside of the flywheel, and cover plate extending over said cooling ribs and forming radial air passages with the same.

References Cited in the file of this patent

UNITED STATES PATENTS

| | | |
|---|---|---|
| 1,417,037 | Cushman | May 23, 1922 |
| 1,754,299 | Ayres et al. | Apr. 15, 1930 |
| 2,066,661 | Vullierme | Jan. 5, 1937 |
| 2,680,007 | Arbuckle | June 1, 1954 |

FOREIGN PATENTS

| | | |
|---|---|---|
| 386,165 | Great Britain | Jan. 12, 1933 |